(12) United States Patent
Steuernagel et al.

(10) Patent No.: US 7,487,161 B2
(45) Date of Patent: Feb. 3, 2009

(54) DISTRIBUTING DATA

(75) Inventors: Ralf Steuernagel, Bruchsal-Buechenau (DE); Wolfgang Kalthoff, Bad Schoenborn (DE)

(73) Assignee: SAP AG, Walldorf (DE)

( * ) Notice: Subject to any disclaimer, the term of this patent is extended or adjusted under 35 U.S.C. 154(b) by 709 days.

(21) Appl. No.: 10/661,352

(22) Filed: Sep. 12, 2003

(65) Prior Publication Data

US 2005/0060275 A1 Mar. 17, 2005

(51) Int. Cl.
*G06F 17/30* (2006.01)
(52) U.S. Cl. .................... 707/100; 707/10; 707/203
(58) Field of Classification Search ............... 707/10, 707/100, 203; 709/203; 705/26–29
See application file for complete search history.

(56) References Cited

U.S. PATENT DOCUMENTS

| | | | | |
|---|---|---|---|---|
| 5,911,131 A | * | 6/1999 | Vig | ............................... 705/1 |
| 6,466,917 B1 | * | 10/2002 | Goyal et al. | .................. 705/18 |
| 7,007,076 B1 | * | 2/2006 | Hess et al. | .................. 709/219 |
| 2006/0149407 A1 | * | 7/2006 | Markham et al. | ........... 700/108 |

* cited by examiner

*Primary Examiner*—Cheryl Lewis
(74) *Attorney, Agent, or Firm*—Schwegman, Lundberg & Woessner, P.A.

(57) ABSTRACT

Methods and apparatus, including computer program products, for distributing data. In one aspect, a computer program product includes instructions. The instructions can be operable to cause a processor to perform operations. The operations can include receiving historical distribution information for a data assembly and determining if distribution of at least a portion of a current version of the data assembly to a target component is warranted based on the historical distribution information. The historical distribution information can identify one or more components that have previously received some version of the data assembly. The product can be tangibly stored on a computer-readable medium.

51 Claims, 8 Drawing Sheets

| REPLICATION TABLE | | | | | | |
|---|---|---|---|---|---|---|
| OBJECT | TARGET | DATE | VERSION | TARGET | DATE | VERSION |
| Object 1 | T1 | Date X | 1.1 | T2 | Date V | 1.0 |
| Object 2 | T1 | Date Y | 1.0 | T2 | - | - |
| Object 3 | T1 | Date X | 2.1 | T2 | Date X | 2.1 |
| Object 4 | T1 | - | - | T2 | Date Z | 2.2 |
| Object 5 | T1 | Date X | 1.1 | T2 | Date Z | 1.4 |

405　410　415　420　410　415　420

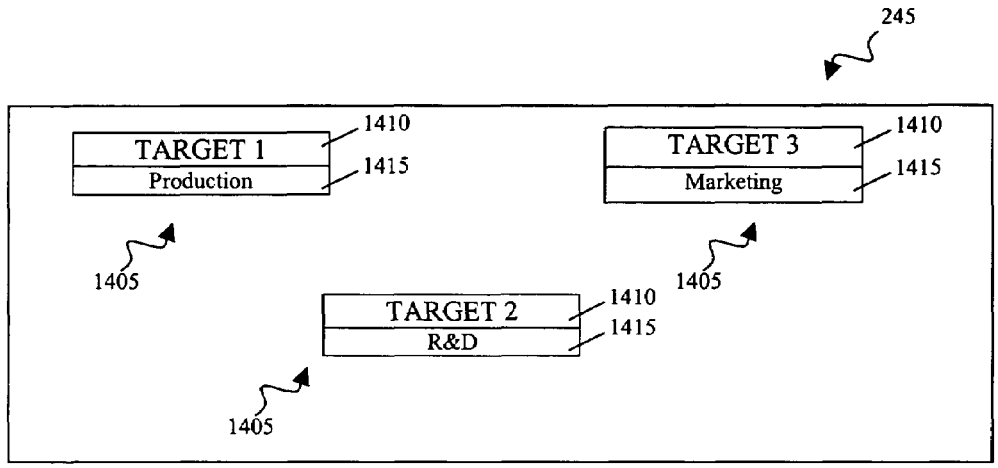

FIG. 14

| BILL OF MATERIALS OBJECT | |
|---|---|
| ELEMENTS | STATE |
| Element 1 | Valid |
| Element 2A | Invalid |
| Element 2B | Valid |
| Element 3 | Valid |

FIG. 15

| RECIPE TABLE | | | | |
|---|---|---|---|---|
| ID# 573.1 | Omelet | Spinach | Formula<br>-3 Extra Large Eggs<br>-6g Spinach<br>-0.2g Salt | Element Hierarchy |
| ID# 573.2 | Omelet | Spinach | Formula<br>-3 Extra Large Eggs<br>-5.8g Spinach<br>-0.2g Salt | Element Hierarchy |
| ID# 573.3 | Omelet | Spinach | Formula<br>-3 Extra Large Eggs<br>-5.8g Spinach<br>-0.2g Salt | Element Hierarchy |

FIG. 16

| VENDOR OBJECT | |
|---|---|
| Name | Acme Co. |
| Ship to Street | Drury Lane |
| Ship to City | Townsville |
| Ship to State | Bliss |
| Ship to Zip | 00000 |
| Ship to Country | Western |
| Phone | 87-57-3717 |
| Fax | 87-57-3718 |
| Web Address | www.acme.comp |
| Email | acme@acme.comp |
| ... | ... |

1715 — Name
1720 — Ship to Street
1725 — Ship to City
1730 — Ship to State
1735 — Ship to Zip 1740 — Acme Co.
1745 — Drury Lane
1750 — Townsville
1755 — Bliss
1760 — 00000

1705  1710

1700

|       | VENDOR OBJECT   |                |       |
|-------|-----------------|----------------|-------|
| 1715  | Name            | Acme Comp.     | 1740  |
| 1720  | Ship to Street  | Drury Lane     | 1745  |
| 1725  | Ship to City    | Townsville     | 1750  |
| 1730  | Ship to State   | Bliss          | 175   |
| 1735  | Ship to Zip     | 00000          | 1760  |
| 1915  | Ship to Country | Western        | 1740  |
| 1920  | Bill to Street  | Drury Lane     | 1745  |
| 1925  | Bill to City    | Townsville     | 1750  |
| 1930  | Bill to State   | Bliss          | 1755  |
| 1935  | Bill to Zip     | 00000          | 1760  |
|       | Bill to Country | Western        |       |
|       | Phone           | 87-57-3717     |       |
|       | Fax             | 87-57-3718     |       |
|       | Web Address     | www.acme.comp  |       |
|       | Email           | acme@acme.comp |       |
|       | ...             | ...            |       |

1800

1705   1710

– continued –

DISTRIBUTING DATA

BACKGROUND

This disclosure relates to data processing, and more particularly, to data management systems and techniques.

Information technology ("IT") environments can include different systems performing processes, such as business processes, on common master data. The different systems can belong to a single entity or to several different entities (such as vendors and contractors for a single, large company). The master data in the IT environment can be stored in a number of different locations, systems, and/or formats. For example, branch offices of a company can work with largely independent systems, adopted companies can introduce new software solutions to a group of affiliated companies, and systems from different vendors can be linked. Disparate master data models can make it difficult to integrate business processes across such diverse IT environments.

Disparate master data can be stored in different systems in an IT environment. Such disparate master data can lead to data redundancies and the storage of irrelevant or incorrect information. For example, if two branches of a single company each collaborate with the same entity, a separate master data object for the entity may be maintained by each of the two branches. This redundancy can result in high content maintenance costs. Further, business analyses performed using redundant or disparate information can lead to poor business decisions. For example, a company-wide analysis of collaborators can fail to identify the correspondence between the two redundant master data objects and business value can be lost.

SUMMARY

The present invention provides methods and apparatus, including computer program products, for distributing data in a data management system.

In one aspect, a method includes adding redundant data to a data assembly based on a characteristic of a component targeted for receipt of the data assembly. The addition is performed in anticipation of distribution of the data assembly.

This and other aspects can include one or more of the following features. The redundant data can be added to the data assembly comprises duplicating a second data assembly referenced by the data assembly. The data assembly, including the redundant data, can be distributed. The redundant data can be added based on a technical characteristic of the component. For example, the redundant data can be added based on a technical ability of the component to handle complex data objects. The redundant data can be added to a data object.

In another aspect, a computer program product includes instructions. The instructions can be operable to cause a processor to perform operations. The operations can include receiving valuation information relating to an appraisal of the appropriateness of a portion of a data assembly for distribution and modifying the data assembly for distribution based on the received valuation information. The product can be tangibly stored on a computer-readable medium.

This and other aspects can include one or more of the following features. The operations can also include receiving an indication of invalidity of the portion of the data assembly and eliminating the invalid portion of the data assembly for distribution. An indication of a change to the portion of the data assembly can be received. The change can relate to an update to a version of a device described by the data assembly. The operations can also include eliminating, for distribution, the portion of the data assembly that describes a previous version of the device described by the data assembly. The data assembly can be automatically identified for distribution upon receipt of the indication of the change to the portion of the data assembly. The complexity of the data assembly can be reduced, for example, by eliminating an object from the data assembly. Plural references to a single data object can also be eliminated. The valuation information can be received as metadata included in the data assembly. The valuation information can relate to a context of a target component, such as an application performed at the target component.

In another aspect, a computer program product includes instructions. The instructions can be operable to cause a processor to perform operations. The operations can include receiving historical distribution information for a data assembly and determining if distribution of at least a portion of a current version of the data assembly to a target component is warranted based on the historical distribution information. The historical distribution information can identify one or more components that have previously received some version of the data assembly. The product can be tangibly stored on a computer-readable medium.

This and other aspects can include one or more of the following features. The operations can include receiving historical distribution information identifying a distributed version of the data assembly and determining if a current version of the data assembly includes changed data for which distribution to the target component is warranted. The distributed version can be previously distributed to the target component.

The operations can also include determining if the current version of the data assembly includes data associated with an updated lifecycle characteristic, and determining if the update to the lifecycle characteristic makes distribution of the associated data to the target component warranted.

The operations can also include determining if the current version of the data assembly includes data applicable to a role of the target component. The current version of the data assembly can be modified for distribution to the target component. The operations can also include identifying a second data assembly related to the data assembly and determining if distribution of the second data assembly is warranted based on the relationship with the data assembly.

In another aspect, a computer program product includes instructions. The instructions can be operable to cause a processor to perform operations. The operations can include receiving a data assembly identified for distribution, extracting a characteristic of the content of the data assembly, and determining if distribution of at least a portion of the data assembly to a target component is warranted based on the characteristic of the content.

This and other aspects can include one or more of the following features. The characteristic of the content can be compared with a characteristic of the target component. The content of the data assembly can be searched for a keyword relevant to the target component or language in the content of the data assembly can be parsed for language relevant to the target component. The operations can include comparing the characteristic of the content with a characteristic of the target component or with a role of the target component. The current version of the data assembly can be modified for distribution to the target component.

These and other aspects can be implemented to realize one or more of the following advantages. A tool for distributing data can assist a central data storage component in the distribution of data to client systems. The tool can use one or more rules to assist in this distribution. The rules can be directed to identifying target components for data distribution or modifying data for data distribution. For example, the format of the sent data can be transformed to a format that the client system is configured to receive.

The details of one or more implementations of the invention are set forth in the accompanying drawings and the description below. Other features and advantages of the invention will become apparent from the description, the drawings, and the claims.

BRIEF DESCRIPTION OF THE DRAWINGS

FIG. 14 is a schematic representation of one implementation of data used in modifying data.

FIG. 15 is a schematic representation of a bill of materials data object.

FIG. 16 is a schematic representation of a recipe table data object.

Like reference numbers and designations in the various drawings indicate like elements.

DETAILED DESCRIPTION

Figure 1:
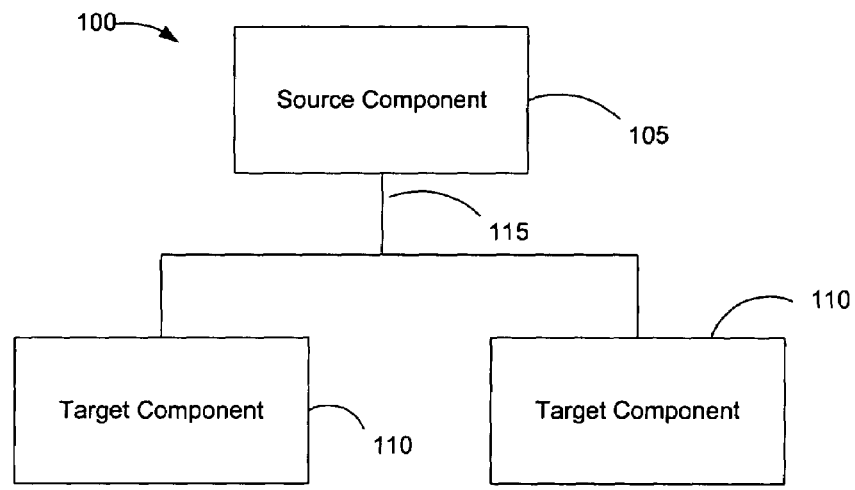
FIG. 1 is a block diagram illustrating an implementation of a data management system.

FIG. 1 shows a data management system 100 in which data is distributed. Data management system 100 includes a source component 105 and one or more target components 110. Source component 105 and target components 110 exchange data by way of a data link 115. For example, data management system 100 can be a product creation system, a project management system, a human resources management system, a customer management system, or any other system in which data is exchanged by the components.

Source component 105 can be a central database system or other data processing system that includes information (in the form of machine-readable data) that is potentially relevant to operations performed at target components 110. Target components 110 can be application servers, clients, or other data processing systems that perform operations in accordance with the logic of a set of machine-readable instructions. Target components 110 can be dedicated to the performance of particular aspects of a shared objective. For example, the target components 120 can be a procurement component, a sales component, a sourcing component, a collaborative engineering component, a manufacturing component, or an enterprise resource planning ("ERP") component involved in a shared product creation objective. Data link 115 can be the Internet, a LAN, a WAN, a collection of wireless transmitters and receivers, or other system for exchanging data.

Figure 2:
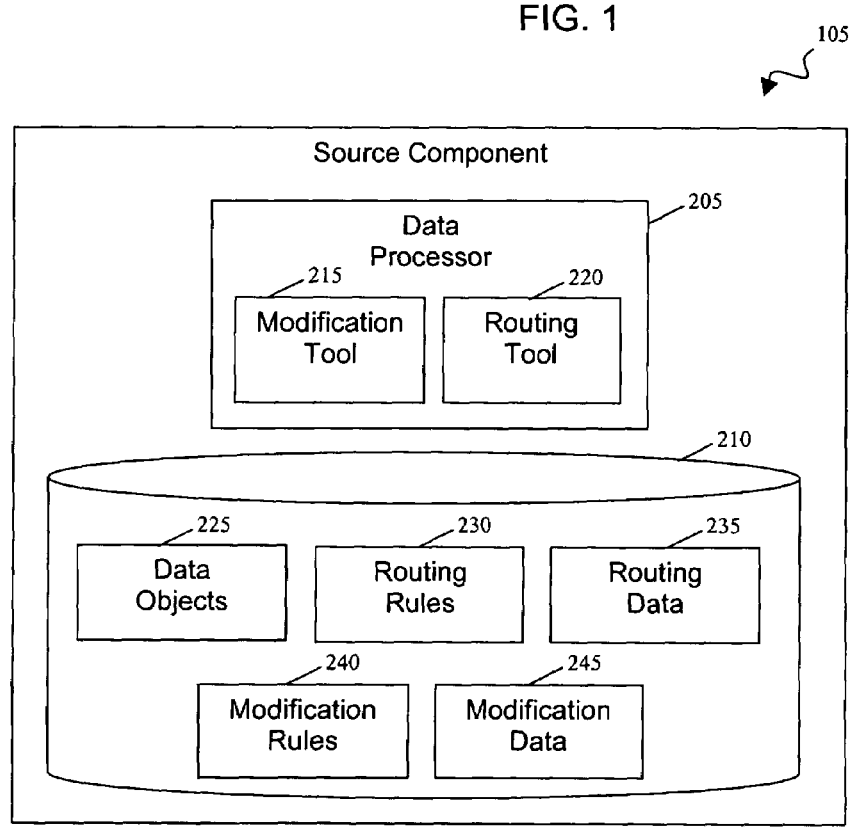
FIG. 2 is a block diagram illustrating an implementation of a source component in the data management system.

FIG. 2 shows an example implementation of source component 105. Source component 105 includes a data processor 205 and a data store 210. Data processor 205 can be a data processing device and/or software that performs processing activities, for example a modification tool 215 and a routing tool 220, in accordance with the logic of a set of machine-readable instructions. Data store 210 is a repository of machine-readable information, including data and instructions for processing activities, for example, a collection of one or more data objects 225, a set of routing rules 230, a set of routing data 235, a set of modification rules 240, and a set of modification data 240.

Modification tool 215 implements one or more approaches to modifying data, for example, data objects from data object collection 225, for distribution. Modification tool 215 can implement the approaches using modification data 240. Routing tool 220 implements one or more approaches to designating one or more target components 110 (FIG. 1) for receipt of the modified data. Routing tool 220 can implement the approaches using routing data 235.

Data object collection 225 can include master data. Master data, also known as standing data, represents information that does not change with the workday transactions of a data processing system. For example, in a enterprise resource planning (ERP) system, master data can include the product information, vendor information, and material information that does not change with workday transactions such as product sales.

Data object collection 225 can include complex data objects. A complex data object is a data object that includes a structured set of other objects or structures. For example, structures and internal tables are complex data objects. A structure is an object that includes two or more elementary data objects in a particular order. An internal table includes two or more data objects with the same configuration. Complex data objects can be used to extend the functionality available to a set of machine-readable instructions. For example, a vendor object can include a first current address of the vendor and a second, future address that becomes effective on the date of the vendor's move.

Figures 3, 4:
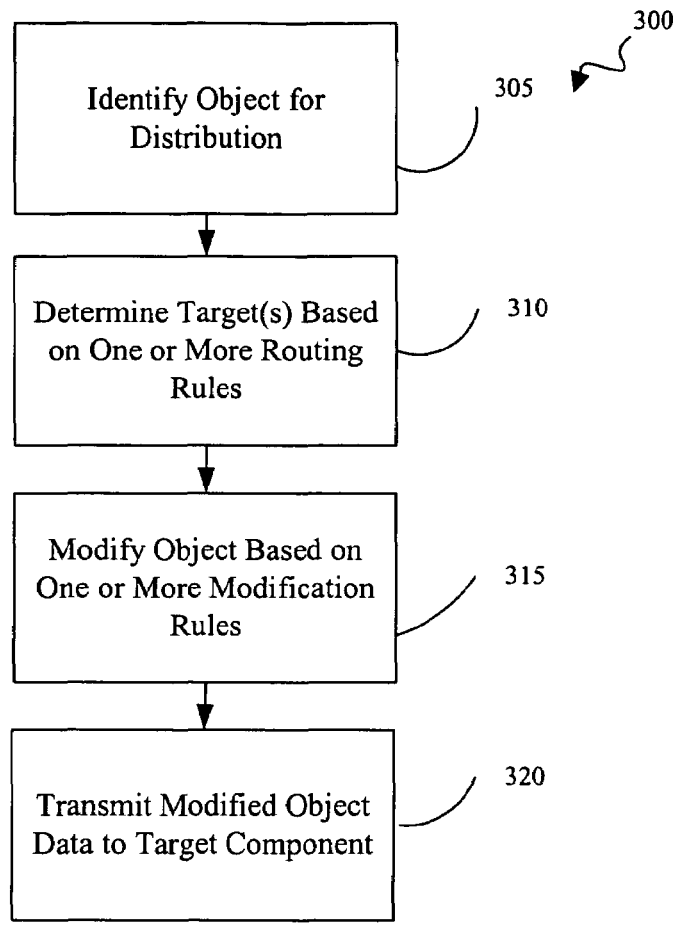
FIG. 3 is a flow chart illustrating a process for distributing data.
FIG. 4 is a schematic representation of a replication table for use in distributing data.

FIG. 3 shows a flowchart of a process 300 for distributing data. Process 300 can be performed by a data processing system such as source component 105 (FIGS. 1 and 2).

The system performing process 300 identifies an object for distribution (step 305).

The system can identify the object in response to one or more triggers. For example, an object can be identified for distribution in reaction to a change to the object or based on a predefined schedule for distribution of the object. Changes in an object that can trigger distribution include the creation of the object, the release of the object, or a change that meets certain criteria. For example, a price change can trigger distribution of a product object that includes the changed price.

The object can be identified through the use of a replication table, such as replication table 400 shown in FIG. 4. Replication table 400 includes information identifying one or more objects 405, information identifying one or more targets 410, information identifying a date on which an identified object was last distributed to an identified target 415, and information identifying the state of identified object that was last distributed to an identified target 420.

A system can use replication table 400 to identify an object for distribution, for example, by comparing the date on which an identified object was last distributed with a schedule for distribution of the object, or by comparing the changes made in the most recent version(s) of an object with the state of the object last distributed to determine if distribution of the most recent version is warranted.

As shown in FIG. 3, the system also determines one or more targets for the identified object based on one or more routing rules (step 310). Routing rules are governing procedures for identifying target components that are to receive a distribution of data, such as the object identified in step 305. Example routing rules are described in further detail below.

The system can also modify an object based on one or more modification rules (step 315). A modification rule is a governing procedure for adapting an object to the particularities associated with a distribution. For example, an object can be modified for distribution to a particular target component. A modification rule can also stipulate that no adaptation of an object is warranted by a distribution. Example modification rules are described in further detail below.

The source system can distribute the modified object to one or more targets determined by the routing rules (step 320). This distribution can be performed over a data link such as data link 115.

Figure 5:
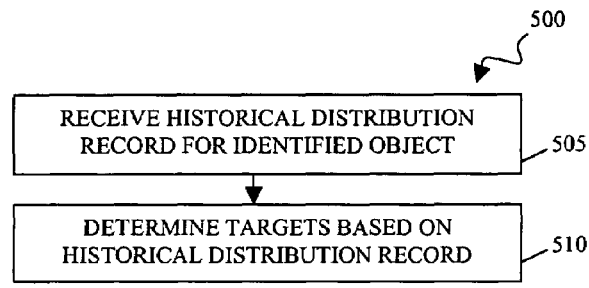
FIG. 5 is a flow chart illustrating an implementation of a process for determining targets.

FIG. 5 shows an implementation of a process 500 for determining one or more targets for an object based on one or more routing rules. Process 500 can be performed as part of step 310 in process 300 (FIG. 3).

Figure 6:
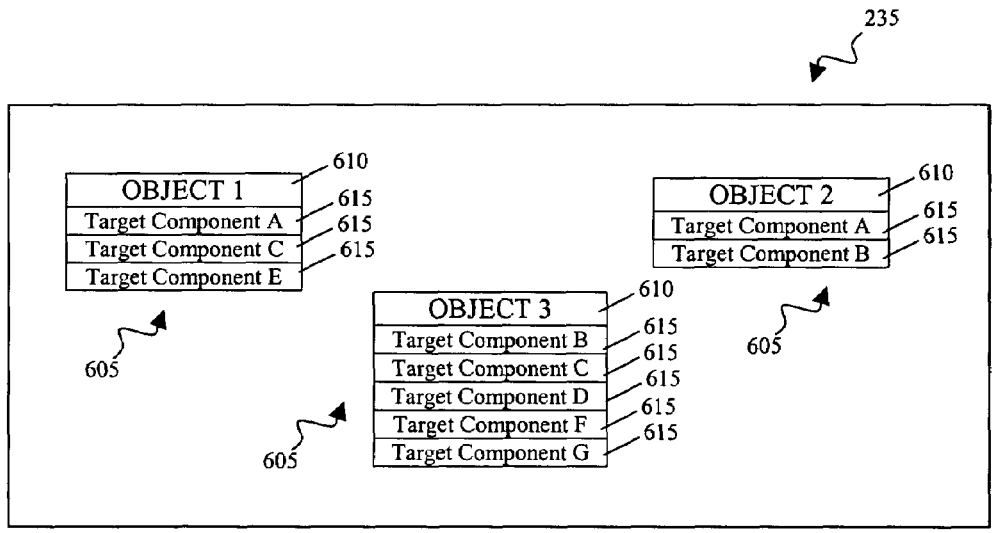
FIG. 6 is a schematic representation of one implementation of routing data used in determining targets.

The system can receive a historical distribution record for the object (step 505). A historical distribution record is a collection of information that identifies one or more targets that have previously received the object. A historical distribution record can be included in a collection of data that is used to implement approaches for determining one or more targets, such as routing data 235 (FIG. 2). Replication table 400 (FIG. 4) can act as a historical distribution record since replication table 400 includes dates 415 identifying which targets 410 received objects 405. FIG. 6 shows another implementation of a historical distribution record in the form of tables 605. Tables 605 each identifies an object 610 and one or more target components 615 that have previously received object 610.

As shown in FIG. 5, the system can determine targets for an object based on the historical distribution record of the object (step 510). For example, the system can determine that all prior recipients of the object are again targets for distribution.

Figure 7:
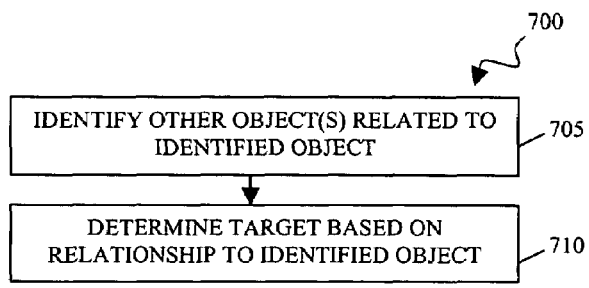
FIG. 7 is a flow chart illustrating another implementation of a process for determining targets.

FIG. 7 shows another implementation of a process 700 for determining one or more targets for an object based on one or more routing rules. Process 700 can be performed as part of step 310 in process 300 (FIG. 3).

The system can identify one or more objects that are related to an object to be distributed to a target (step 705). The related objects can relate to the object to be distributed in a variety of ways. For example, the related objects can be components or subcomponents of the object to be distributed, the related objects can include information describing elements that are similar to or associated with an element described in the object to be distributed, or the related objects can describe alternative versions of an element described in the object to be distributed.

Figure 8:
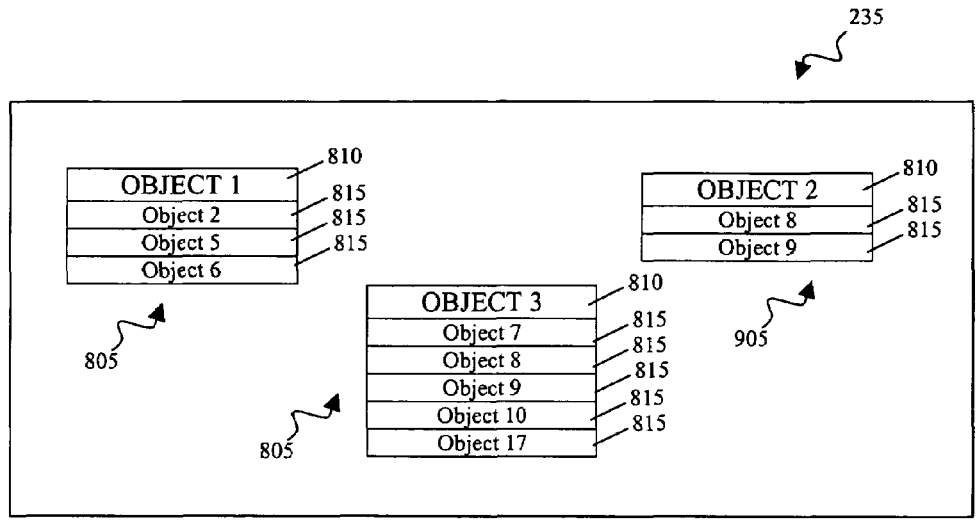
FIG. 8 is a schematic representation of one implementation of data used in determining targets.

The relationships between objects can be described in the objects themselves. For example, a bill of materials for a product can identify objects that correspond to constituent parts of the product. As another example, a recipe object describing a process flow for a production process can identify equipment objects that describe equipment for the performance of the process flow. Alternatively, the relationships between objects can be described in a collection of data that is used to implement approaches for determining one or more targets, such as routing data 235 (FIG. 2). FIG. 8 shows example tables 805 that store information identifying an object to be distributed 810 and one or more other related objects 815.

As shown in FIG. 7, the system can determine a target for the related objects based on their relationship to an object to be distributed (step 705). For example, when a relationship between two objects is identified in table 805, the system can determine that joint distribution of any objects identified in information 810, 815 is warranted.

Figure 9:
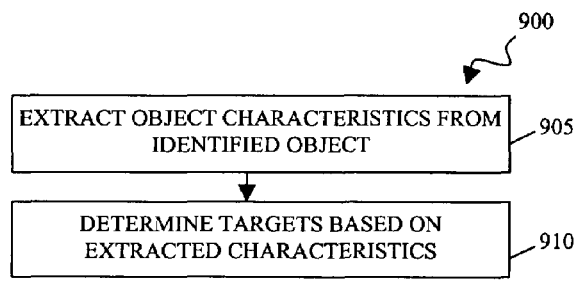
FIG. 9 is a flow chart illustrating another implementation of a process for determining targets.

FIG. 9 shows another implementation of a process 900 for determining one or more targets for an object based on one or more routing rules. Process 900 can be performed as part of step 310 in process 300 (FIG. 3).

The system can extract characteristics of the object that are useful in determining targets (step 905). The system can extract the characteristics using one or more techniques such as keyword searches, language parsing, and rule-based systems for identifying one or more characteristics of the object. For example, the system can use language parsing to identify that an object includes language relevant to a sales brochure or other marketing material. As another example, a keyword search may determine that an object such as a process flow recipe or a material includes information relevant to operations at a particular processing plant.

Figure 10:
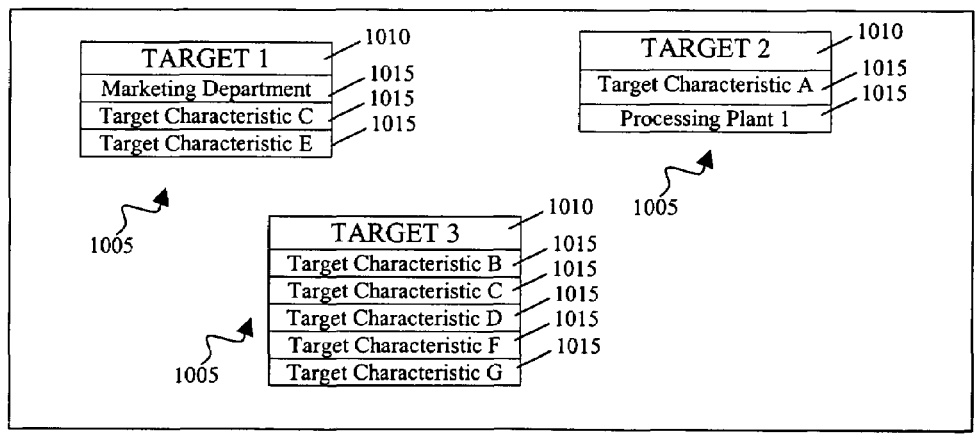
FIG. 10 is a schematic representation of one implementation of data used in determining targets.

The system can use the extracted characteristics to determine targets for distribution of the object (step 910). For example, the system can compare the extracted object characteristics with characteristics of one or more potential targets. The characteristics can be predetermined and included in a collection of data that is used to implement approaches for determining one or more targets, such as routing data 235 (FIG. 2). FIG. 10 shows example tables 1005 that store information identifying a target 1010 and one or more characteristics of the target 1015. Target characteristics 1015 are suitable for comparison with the characteristics extracted from an object for determining targets for distribution of the object.

One particular class of object characteristics that is useful in determining targets is the class of object lifecycle characteristics. The lifecycle of an object can be described in terms of stages through which the information in the object passes. For example, a product specification may pass through a planning stage, a development stage, a testing stage, a released-for-production stage, a released-for-marketing stage, and an archived stage as the product is created, produced, and retired. A lifecycle characteristic can identify the lifecycle of information in the object. Lifecycle characteristics can be extracted from the object in the same manner that other characteristics are extracted. For example, the lifecycle of an object can be identified in a dedicated lifecycle field in the object.

A system can use an extracted lifecycle characteristic to determine targets for distribution of the object. For example, if a product specification object is still in the planning stage, targets that participate in the planning and conceptualization of the product can be identified as suitable targets for distribution. As another example, if a product specification object has been released for production, targets that participate in the production of the object can be identified as suitable targets for distribution.

Figure 11:
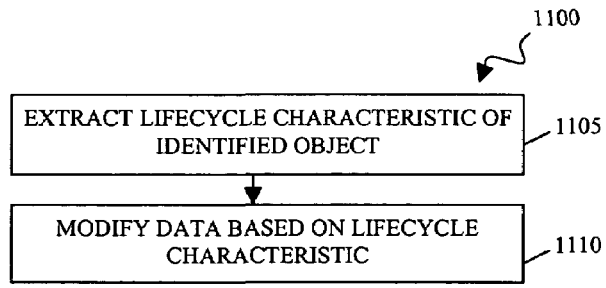
FIG. 11 is a flow chart illustrating an implementation of a process for modifying data.

Lifecycle characteristics can also be used when modifying an object based on one or more modification rules. FIG. 11 shows such a process 1100. Process 1100 can be performed as part of step 315 in process 300 (FIG. 3).

The system can extract one or more lifecycle characteristic of the object that are useful in modifying the object (step 1105). The extracted lifecycle characteristic can relate to the stage of the entire object or to the stage of a portion of the object, such as one or more fields in the object.

The system can use the extracted lifecycle characteristic to modify the object based on one or more modification rules (step 1110). The modification can include changing or withholding portions of the object from distribution based on characteristics of the target system and a lifecycle characteristic of the withheld portion. For example, a portion of an product specification object that relates a preliminary design can be withheld from distribution to a target at a production site. However, when the same preliminary design is released for production, that portion of the product specification object can be distributed to the target.

Figure 12:
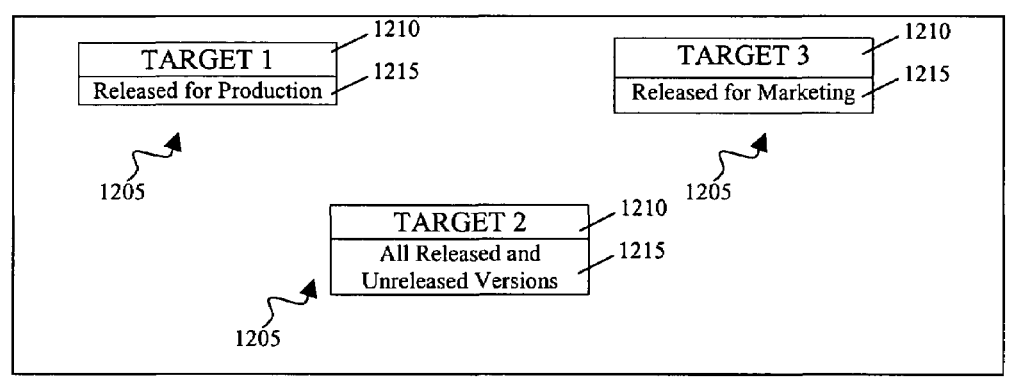
FIG. 12 is a schematic representation of one implementation of data used in modifying data.

The target characteristics can be predetermined and included in a collection of data that is used to implement approaches for modifying objects, such as modification data 235 (FIG. 2). FIG. 12 shows example tables 1205 that store information identifying a target 1210 and one or more characteristics of the target 1215 that are relevant to determining if modification of an object based on the lifecycle of the object is warranted. For example, target characteristics 1215 can be compared with one or more lifecycle characteristics extracted from the object to determine if all or a portion of the object is to be distributed to the target.

Figure 13:
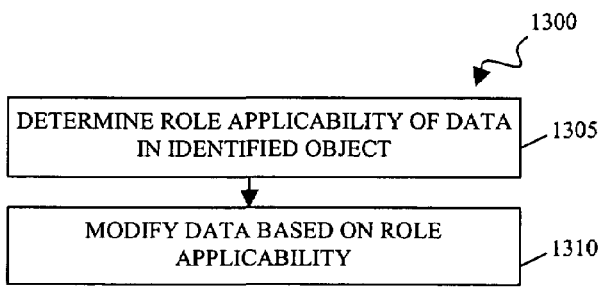
FIG. 13 is a flow chart illustrating another implementation of a process for modifying data.

FIG. 13 shows another implementation of a process 1300 for modifying an object based on one or more modification rules. Process 1300 can be performed as part of step 315 in process 300 (FIG. 3).

The system can determine the role applicability of data in an object (step 1305). The role applicability of an object is the pertinence of the object to certain activities. Roles can be defined in accordance with the departmental structure of an organization. For example, research and development, production, distribution, marketing, and sales roles can be defined. Role applicability can be determined by extracting one or more role characteristics of the object. Role characteristics can be extracted from the object in the same manner that other characteristics are extracted. Role characteristics, and hence role applicability, can relate to the entire object or to a portion of the object, such as one or more fields and/or field groups in the object.

The system can use the role applicability of data to modify the object based on one or more modification rules (step 1310). For example, the system can compare the role applicability with role characteristics of one or more potential targets. The target role characteristics can be predetermined and included in a collection of data that is used to implement approaches for modifying objects, such as modification data 235 (FIG. 2).

FIG. 14 shows example tables 1405 that store information identifying a target 1410 and one or more characteristics of the target 1415. Target characteristics 1415 are suitable for comparison with the role applicability of data in an object for determining if modification of the object is warranted.

As discussed above, the modification of a data object for distribution can include changing or withholding portions of the object from distribution based on characteristics of the target system. The portions of the object that are to be withheld can be determined using an approach called valuation. Valuation is an appraisal of the appropriateness of a portion of an object, or the object itself, for distribution. Valuation can be used to determine a perspective on an object for distribution based on the context. The perspective can be simpler that the object itself, making the object understandable to and compatible with a target component. The context can include, for example, a date, an application performed at the target component (for example, manufacturing or sales), or a specific configuration of the target component. The resulting perspective can be determined using metadata included in the object model.

For example, Valuation can be based on metadata that identifies the validity of a portion of an object. FIG. 15 shows a bill of materials object 1500 that identifies four elements 1505, 1510, 1515, 1520 and metadata 1525, 1530, 1535, 1540 relating to the respective of elements 1505, 1510, 1515, 1520. In particular, metadata 1525 indicates that element 1505 is valid, metadata 1535 indicates that element 1515 is valid, metadata 1540 indicates that element 1520 is valid, and metadata 1530 indicates that element 1510 is invalid. Element 15 10 may be invalid, e.g., because data in element 15 10 has expired (i.e., passed beyond a validity lifespan) or simply because element 15 10 is not available at the present time and hence not part of the corresponding (real world) bill of materials. A system that is modifying bill of materials object 1500 can withhold element 1510 from distribution based on the invalidity indicated by metadata 1530.

Valuation can also be based on metadata that identifies the version of a portion of an object. FIG. 16 shows a recipe table 1600 that includes three different versions of a recipe 1605, 1610, 1615. A recipe is a collection of data for use in the manufacture and production of products. The information included in the recipe can describes, for example, the manufacturing or production process, raw materials, and processing equipment.

Recipes can include a hierarchical description of a process flow. Recipes generally include several different classes of process elements that are arranged in the recipe hierarchy and describe the process flow at various levels of detail. Recipes can also include definitions of resource, input, and output requirements for the process flow.

In FIG. 16, recipes 1605, 1610, 1615 each include an identification number 1620, a product class description 1625, a product name description 1630, a formula 1635, and an element hierarchy 1640. A formula is a list of inputs and outputs of a recipe. Identification numbers 1620 can each include a suffix 1645, 1650, 1655 that identifies the version of the respective of recipes 1605, 1610, 1615. In particular, suffix 1655 identifies that recipe 1615 is the most current version, whereas suffices 1645, 1650 identify that recipes 1605, 1610 are older, but still valid, versions. A system that is modifying recipe table 1600 can withhold recipes 1605, 1610 from distribution based on the version information provided in suffices 1645, 1650. The system can also subsequently deliver recipes 1610, 1615 as separate entities if the information in recipes 1610, 1615 is desired at a target component.

Valuation can also be based on metadata that identifies the configuration of a device described by an object. The configuration of a device is the structural arrangement of parts or elements of the device. A device can be described in terms of a configurable product model that describes two or more different configurations of the device. For example, if a coffee machine is configurable to have five different arrangements as described in a configuration model, a system can separate the five variants into five discrete coffee machine configurations for distribution. Any or all of the separate configurations can subsequently be distributed.

Figures 17, 18:
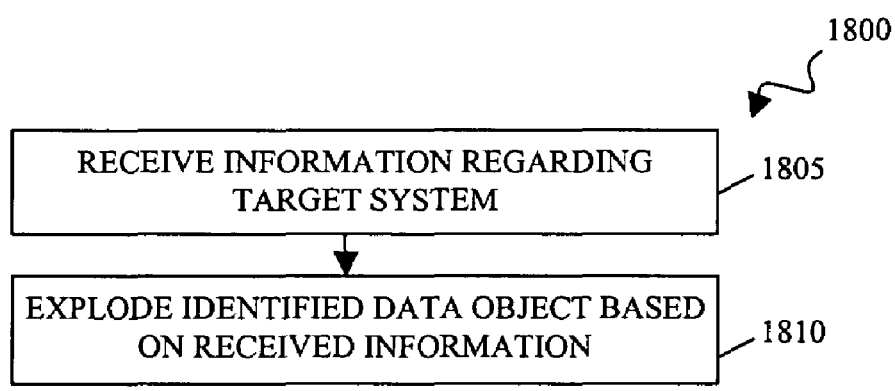
FIG. 17 is a schematic representation of a vendor data object.
FIG. 18 is a flow chart illustrating another implementation of a process for modifying data.
Figures 19, 20:
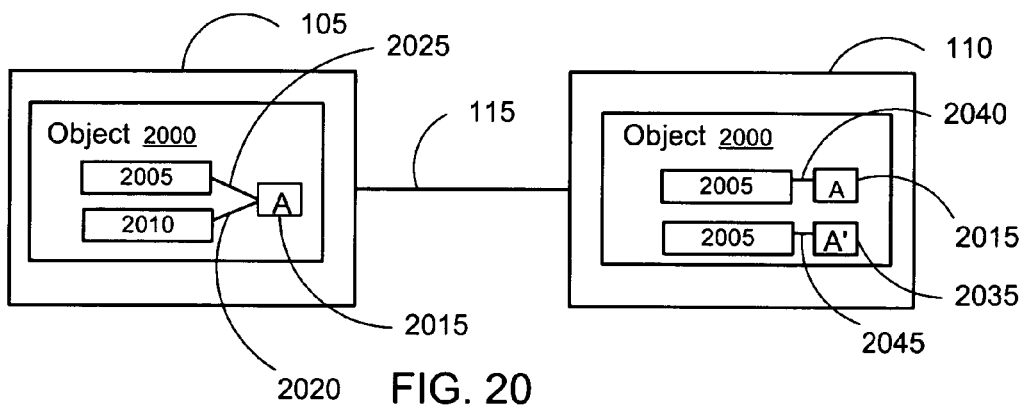
FIG. 19 is a schematic representation of the vendor data object of FIG. 18 after explosion.
FIG. 20 is a schematic representation of another implementation of a process for modifying data.

The modification of a data object can also include exploding portions of the object for distribution. FIG. 17 shows a vendor record object 1700 that includes a collection of attributes 1705 and values 1710 that together describe a vendor. Attributes 1705 are traits of vendors while values 1710 are denominations of the traits of the particular, described vendor.

Among attributes 1705 are the street 1715, the city 1720, the state 1725, the zip postal code 1730, and the country 1735 of shipping address of the vendor. Attributes 1715, 1720, 1725, 1730, 1735 are denominated by corresponding values 1740, 1745, 1750, 1755, 1760.

FIG. 18 shows a process in which a data object, for example, data object 1700, can be exploded for distribution to a target system. The explosion of a data object generally involves adding redundant data to a data object. Redundant data is data that exceeds the minimal amount of data necessary to describe the subject of an object to a given extent. By adding redundant data during an explosion, the format of a data object can be configured for distribution to a target component. The explosion process in FIG. 18 can be performed as part of step 315 in process 300 (FIG. 3).

The system receives information regarding the target system (step 1805). The received target system information can describe the technical capabilities of the target system to handle data objects. For example, the system can receive information identifying the attribute fields and their format in a particular class of data objects in the target system, or the system can receive an example object and then extract field and format information for written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or an Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular implementations. Other implementations are within the scope of the following claims. For example, the steps of the invention can be performed in a different order and still achieve desirable results.

What is claimed is:

1. A computer program product, tangibly stored on one or more computer-readable storage devices, the computer program product comprising instructions operable to cause one or more processors to perform operations, the operations comprising:

receiving first valuation information describing results of a first evaluation of an appropriateness of distributing a first portion of a data assembly to a first component in a data management system;

modifying the data assembly for distribution based on the first valuation information;

making the modified data assembly available for distribution to the first component;

receiving second valuation information describing results of a second evaluation of appropriateness of distributing a second portion of the data assembly to a second component in the data management system;

modifying the data assembly for distribution based on the second valuation information;

making the modified data assembly available for distribution to the second component;

distributing the modified data assembly to the first component; and distributing the modified data assembly to the second component.

2. The product of claim 1, wherein the operations further comprise:

receiving an indication of invalidity of the first portion of the data assembly; and modifying the data assembly by eliminating the invalid first portion of the data assembly for distribution.

3. The product of claim 1, wherein the operations further comprise receiving an indication of a change to the first portion of the data assembly, the change relating to an update to a version of a device described by the data assembly.

4. The product of claim 3, wherein modifying the data assembly comprises eliminating, for distribution, the first portion of the data assembly that describes a previous version of the device described by the data assembly.

5. The product of claim 3, wherein the operations further comprise automatically identifying the data assembly for distribution upon receipt of the indication of the change to the first portion of the data assembly.

6. The product of claim 1, wherein modifying the data assembly comprises reducing complexity of the data assembly.

7. The product of claim 6, wherein reducing complexity of the data assembly comprises eliminating an object from the data assembly.

8. The product of claim 1, wherein modifying the data assembly comprises eliminating plural references to a single data object.

9. The product of claim 1, wherein the operations further comprise receiving the first valuation information as metadata included in the data assembly.

10. The product of claim 1, wherein the first valuation information is based at least in part on a context of the first target component of a data management system.

11. The product of claim 10, wherein the first valuation information is based at least in part on an application performed at the first target component.

12. The product of claim 1, wherein the data assembly comprises master data and distribution of the data assembly is part of master data management in the data management system.

13. The product of claim 1, wherein the operations further comprise distributing, to the first component, the data assembly modified based on the first valuation information.

14. A computer program product, tangibly stored on one or more computer-readable media storage devices, the computer program product comprising instructions operable to cause one or more processors to perform operations, the operations comprising:

receiving historical distribution information for a data assembly, the historical distribution information identifying one or more components of a data management system that have previously received some version of the data assembly;

determining if distribution of at least a portion of a current version of the data assembly to a target component of the data management system is warranted based on the historical distribution information;

making at least the portion of the current version of the data assembly available for distribution to the target component in response to determining that distribution is warranted; and distributing the portion of the current version of the data assembly to the target component.

15. The product of claim 14, wherein:

the historical distribution information identifies a distributed version of the data assembly, the distributed version being previously distributed to the target component; and determining if distribution is warranted comprises determining if a current version of the data assembly includes changed data for which distribution to the target component is warranted.

16. The product of claim 14, wherein determining if distribution is warranted comprises:

determining if the current version of the data assembly includes data associated with an updated lifecycle characteristic; and determining if the updated lifecycle characteristic makes distribution of the associated data to the target component warranted.

17. The product of claim 14, wherein determining if distribution is warranted comprises determining if the current version of the data assembly includes data applicable to a role of the target component.

18. The product of claim 14, wherein the operations further comprise modifying the current version of the data assembly for distribution to the target component.

19. The product of claim 14, wherein the operations further comprise:

identifying a second data assembly related to the data assembly; and determining if distribution of the second data assembly is warranted based on a relationship of the second data assembly to the data assembly.

20. The product of claim 14, wherein the data assembly comprises master data and distribution of the data assembly is part of master data management in the data management system.

21. The product of claim 14, wherein the operations further comprise distributing at least the portion of the current version of the data assembly available to the target component.

22. A computer program product, tangibly stored on one or more computer-readable storage devices, the computer program product comprising instructions operable to cause one or more processors to perform operations, the operations comprising:

receiving a data assembly identified for distribution to one or more target components in a data management system;

extracting a characteristic of content of the data assembly;

determining if distribution of at least a portion of the data assembly to a first target component of the data management system is warranted based on a comparison of the characteristic of the content with a characteristic of the first target component;

making at least the portion of the data assembly available for distribution to the first target component in response to determining that distribution to the first target is warranted;

determining if distribution of at least the portion of the data assembly to a second target component of the data management system is warranted based on a comparison of the characteristic of the content with a characteristic of the second target component;

making at least the portion of the data assembly available for distribution to the second target component in response to determining that distribution to the second target component is warranted;

distributing at least the portion of the data assembly to the first target component; and distributing at least the portion of the data assembly to the second target component.

23. The product of claim 22, wherein extracting the characteristic of the content comprises searching the content of the data assembly for a keyword relevant to the first target component.

24. The product of claim 22, wherein extracting the characteristic of the content comprises parsing language in the content of the data assembly for language relevant to the first target component.

25. The product of claim 22, wherein determining if distribution is warranted comprises comparing the characteristic of the content with a technical characteristic of the first target component.

26. The product of claim 22, wherein determining if distribution is warranted comprises comparing the characteristic of the content with a role of the first target component.

27. The product of claim 22, wherein the operations further comprise modifying current version of the data assembly for distribution to the first target component.

28. The product of claim 22, wherein the data assembly comprises master data and distribution of the data assembly is part of master data management in the data management system.

29. A method implemented using a data-processing device, the method comprising:
   receiving first valuation information describing results of a first evaluation of an appropriateness of distributing a first portion of a data assembly to a first component in a data management system;
   modifying the data assembly for distribution based on the first valuation information;
   making the modified data assembly available for distribution to the first component;
   receiving second valuation information describing results of a second evaluation of an appropriateness of distributing a second portion of the data assembly to a second component in the data management system;
   modifying the data assembly for distribution based on the second valuation information;
   making the modified data assembly available for distribution to the second component;
   distributing the modified data assembly to the first component; and
   distributing the modified data assembly to the second component.

30. The method of claim 29, further comprising:
   receiving an indication of invalidity of the first portion of the data assembly; and
   modifying the data assembly by eliminating the invalid first portion of the data assembly for distribution.

31. The method of claim 29, further comprising receiving an indication of a change to the first portion of the data assembly, the change relating to an update to a version of a device described by the data assembly.

32. The method of claim 31, wherein modifying the data assembly comprises eliminating, for distribution, the first portion of the data assembly that describes a previous version of the device described by the data assembly.

33. The method of claim 31, further comprising automatically identifying the data assembly for distribution upon receipt of the indication of the change to the first portion of the data assembly.

34. The method of claim 29, wherein modifying the data assembly comprises reducing complexity of the data assembly.

35. The method of claim 34, wherein reducing complexity of the data assembly comprises eliminating an object from the data assembly.

36. The method of claim 29, wherein modifying the data assembly comprises eliminating plural references to a single data object.

37. The method of claim 29, further comprising receiving the first valuation information as metadata included in the data assembly.

38. The method of claim 29, wherein the first valuation information is based at least in part on a context of the first target component of a data management system.

39. The method of claim 38, wherein the first valuation information is based at least in part on an application performed at the first target component.

40. A method implemented using a data-processing device, the method comprising: receiving historical distribution information for a data assembly, the historical distribution information identifying one or more components of a data management system that have previously received some version of the data assembly;
   determining if distribution of at least a portion of a current version of the data assembly to a target component of the data management system is warranted based on the historical distribution information;
   making at least the portion of the current version of the data assembly available for distribution to the target component in response to determining that distribution is warranted; and
   distributing the portion of the current version of the data assembly to the target component.

41. The method of claim 40, wherein:
   the historical distribution information identifies a distributed version of the data assembly, the distributed version being previously distributed to the target component; and
   determining if distribution is warranted comprises determining if a current version of the data assembly includes changed data for which distribution to the target component is warranted.

42. The method of claim 40, wherein determining if distribution is warranted comprises:
   determining if the current version of the data assembly includes data associated with an updated lifecycle characteristic; and
   determining if the updated lifecycle characteristic makes distribution of the associated data to the target component warranted.

43. The method of claim 40, wherein determining if distribution is warranted comprises determining if the current version of the data assembly includes data applicable to a role of the target component.

44. The method of claim 40, further comprising modifying the current version of the data assembly for distribution to the target component.

45. The method of claim 40, further comprising:
   identifying a second data assembly related to the data assembly; and
   determining if distribution of the second data assembly is warranted based on a relationship of the second data assembly to the data assembly.

46. A method implemented using a data-processing device, the method comprising:
   receiving a data assembly identified for distribution to one or more target components in a data management system;
   extracting a characteristic of content of the data assembly;
   determining if distribution of at least a portion of the data assembly to a first target component of the data management system is warranted based on a comparison of the characteristic of the content with a characteristic of the first target component;

making at least the portion of the data assembly available for distribution to the first target component in response to determining that distribution to the first target is warranted;

determining if distribution of at least the portion of the data assembly to a second target component of the data management system is warranted based on a comparison of the characteristic of the content with a characteristic of the second target component;

making at least the portion of the data assembly available for distribution to the second target component in response to determining that distribution to the second target component is warranted;

distributing at least the portion of the data assembly to the first target component; and distributing at least the portion of the data assembly to the second target component.

47. The method of claim 46, wherein extracting the characteristic of the content comprises searching the content of the data assembly for a keyword relevant to the first target component.

48. The method of claim 46, wherein extracting the characteristic of the content comprises parsing language in the content of the data assembly for language relevant to the first target component.

49. The method of claim 46, wherein determining if distribution is warranted comprises comparing the characteristic of the content with a technical characteristic of the first target component.

50. The method of claim 46, wherein determining if distribution is warranted comprises comparing the characteristic of the content with a role of the first target component.

51. The method of claim 46, further comprising modifying current version of the data assembly for distribution to the first target component.

* * * * *